Figure 1:
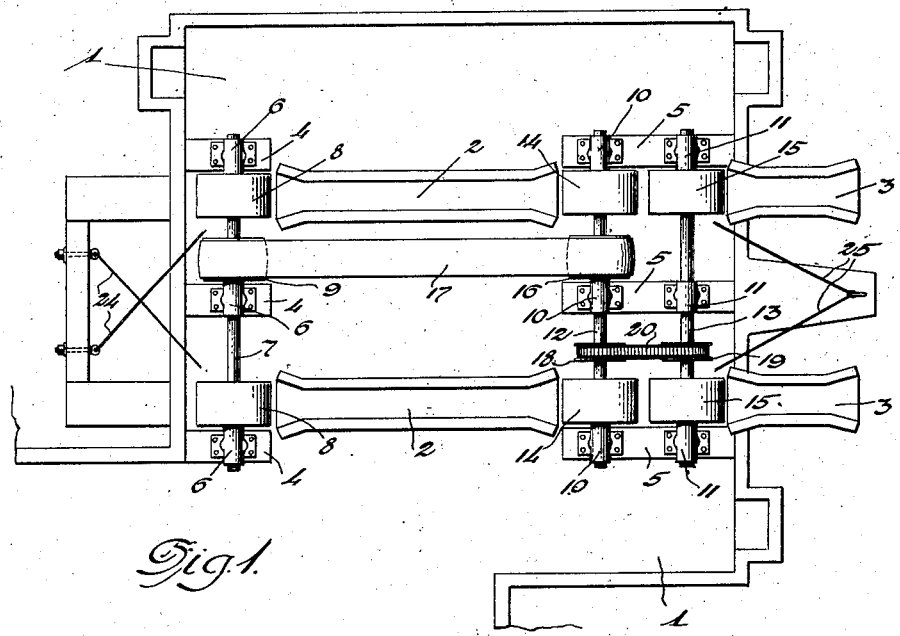

Aug. 4, 1925.

C. H. FENNELL 1,548,193

AUTOMOBILE TESTING AND ADJUSTMENT TRACK

Filed Aug. 11, 1924

Inventor:
Charles H. Fennell
By
Attorneys.

Patented Aug. 4, 1925.

1,548,193

UNITED STATES PATENT OFFICE.

CHARLES H. FENNELL, OF DETROIT, MICHIGAN.

AUTOMOBILE TESTING AND ADJUSTMENT TRACK.

Application filed August 11, 1924. Serial No. 731,375.

*To all whom it may concern:*

Be it known that I, CHARLES H. FENNELL, a citizen of the United States, residing at Detroit, in the county of Wayne and State of Michigan, have invented certain new and useful Improvements in Automobile Testing and Adjustment Tracks, of which the following is a specification, reference being had therein to the accompanying drawings.

This invention relates to means applicable for use in facilitating the adjustment of various parts of an automobile as well as permitting testing of automobile parts in order to determine their efficiency; the object of the said invention being to provide for the operation of the different parts of an automobile usually brought into use when it is traveling over a roadway, and to secure such operation of the parts whilst the car is stationary in order that adjustments of the said parts may be made from time to time and operation thereof continued throughout a period of time corresponding to desirable operation of the vehicle over a roadway for a sufficient distance to bring about such actuation and wearing of the parts as may be necessary for their proper adjustments or to bring them to a desirable working condition.

A still further object is to provide means whereby a stationary automobile may operate under its own power in a manner in all practical respects simulating travel of the said vehicle over a roadway; and a still further object is to provide an apparatus driven by the power plant of an automobile which will result in the simultaneous operation of the four wheels of the automobile in a manner simulating the travel thereof over a roadway, whereby the parts of the said automobile may be subjected to the transmission of power therethrough or permitted to resist the force of such power as in actual road use.

In effecting the adjustment or testing of many of operating parts of an automobile (such as adjustment of the wheel brakes and the burning in of brake bands, particularly where four wheel brakes are used, and in the testing of such brakes throughout an initial period) it is usual to take the automobile out upon the road and drive it for a certain number of miles in order that the result of such driving and the performance during such driving may be ascertained. During this running it is not convenient to make all the desirable observations or to effect all of the adjustments from time to time which may be necessary. This road testing is also carried out for the purpose of tuning up the engine of the automobile, for the determining and locating of any noises which may become apparent in the engine, axle, transmission or other parts of the automobile, for the observation of the tramming of the wheels thereof, and ascertaining other performance of the automobile; and in most of these cases records of faulty operation must be made during such running which records as a rule, can only be taken advantage of after the car has been returned to the factory or shop where facilities are provided to correct faults or make certain adjustments.

It is therefore an important object of this invention to provide simple and efficient means for the running of an automobile in a stationary position under observation in a manner permitting the carrying out of the purposes of such road work in a very convenient manner.

Further objects subsidiary to or resulting from the aforesaid objects, or from the construction or operation of the invention as it may be carried into effect, will become apparent as the said invention is hereinafter further disclosed.

In carrying the said invention into effect I may arrange, preferably in a suitable pit provided with a runway, an endless track in the form of front and rear rollers geared together by an endless band and auxiliary rollers spaced from said rear rollers and geared thereto, thus forming a continuation of said track whereby said track is of greater length than the wheel base of an automobile which may be supported on the said track. The rear wheels of the automobile rest between the said rear rollers and the auxiliary rollers whereby power may be transmitted from the engine of said automobile through the rear wheels to said rear rollers, and from said rear rollers through said endless band and said forward rollers to the front wheels of said automobile, whereby the front wheels thereof will operate with the rear wheels by virtue of the operation of the engine in the same manner as when such automobile travels over a roadway. All of which is more particularly described and ascertained hereinafter by way of example having reference to the accompanying drawing, wherein—

Figure 2:
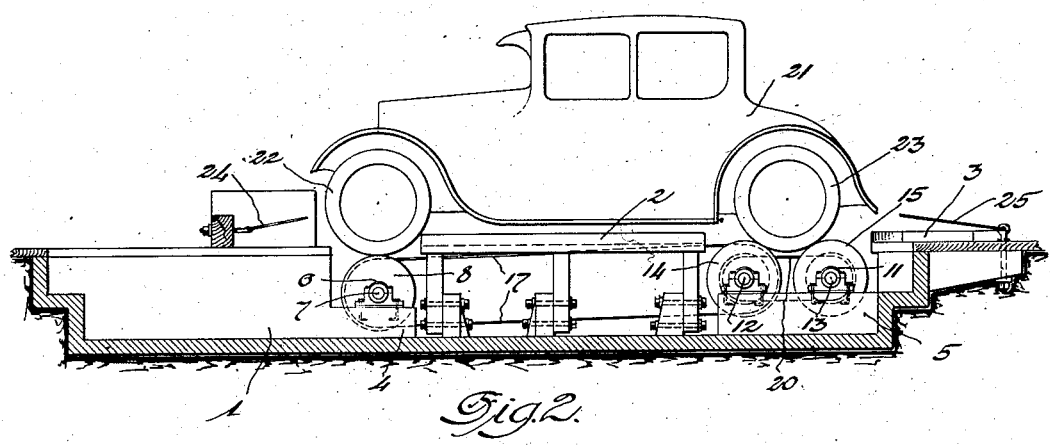

Figure 1 is a plan view of an apparatus constructed in accordance with this invention, and Figure 2 is an elevation of the said apparatus showing an automobile in position thereon.

Similar characters of reference indicate similar parts in both figures of the drawing.

1 indicates a pit having runways 2 therein and approaches 3, the said pit being provided with pedestals 4 at the forward end thereof and further pedestals 5 at the rear end of the said pit. The pedestals 4 are provided with bearings 6 for a shaft 7 upon which are mounted rollers 8 and a pulley 9 intermediate thereof, the rollers 8 being spaced to agree with the spacing of the wheels of an automobile with which the device is to be used.

The pedestals 5 are each also similarly provided with a pair of bearings 10 and 11 having shafts 12 and 13 journaled therein respectively which shafts have mounted thereon rollers 14 and 15 spaced similarly to the rollers 8 of the shaft 7, and 16 is a pulley mounted on the shaft 12 intermediate of the rollers 14 and geared to the pulley 9 by means of an endless band 17 whereby motion of the rollers 14 may be transmitted to the rollers 8.

Also mounted on the shaft 12 is a gear wheel 18 geared to a similar wheel 19 on the shaft 13 by means of a chain 20, which ensures the rotation of the rollers 14 and 15 in the same direction and the transmission of power therebetween.

This arrangement of rollers and gearing forms an endless track for a motor vehicle as will be readily apparent from the illustration, Figure 2 of the drawing, which shows an automobile 21 having its front wheels 22 resting on the rollers 8 and its rear wheels 23 resting between the rollers 14 and 15; and it will be readily understood that with an automobile in such position, and upon the operation of the engine thereof to drive the rear wheels, power will be transmitted from such rear wheels through the endless band described to the front wheels of the automobile and effect their rotation in the same manner as the said rear wheels.

Thus all of the parts of the automobile which would be actuated by the power of the engine in the travel of the automobile over a roadway will be similarly actuated when the said automobile is mounted upon the device, consequently the effect of the application of brakes either upon the rear wheels or the front wheels, or both, may be performed and the result noted; or the application of the brakes may be performed for the purpose of bringing about results such as the burning in of the said brake bands or the subjecting of the same to such wear or strain as may be necessary to properly determine their function and effect their adjustment.

Similarly such operations may be carried out with other parts of the vehicle such as the speedometer, the bearings of the front wheels, the transmission and so forth; and the running of the parts for the purpose of tuning the engine, transmission, or other mechanism may be readily effected, either freely or against any resistance which it may be desirable to offer to such running such as by the application of the brakes to any or all of the wheels of the automobile.

24 and 25 indicate ropes or tie rods which may be used for the purpose of securing the automobile in position and said ropes or rods being attached to the automobile in any convenient manner.

The advantages of such a device will be readily apparent from the foregoing description and its use practically does away with the necessity of running the car on a roadway for the purpose as hereinbefore explained thereby saving considerable time and expense; and it will be obvious that the use of said device also permits of an automobile being run in a stationary position for purposes of demonstration so that the prospective purchaser may himself drive the car practically under road conditions in order to satisfy himself of its performance without necessitating the removal of the automobile from the place of demonstration.

I attach considerable importance to the fact that the device is applicable for the running in of a motor vehicle as described, the application of the same for testing or recording purposes being secondary to such object.

This invention may be developed within the scope of the appended claims without departing from the essential features of the invention, and it is desired that the specification and drawing be read as being merely illustrative and not in a limiting sense, except as necessitated by the prior art.

What I claim is:—

1. In a device of the class described, means adapted to transmit motion from the rear to the front wheels of a stationary operating automobile, said means being in the form of front and rear rollers geared together by an endless band, said rollers frictionally abutting the front and rear wheels respectively, of said automobile, fixed runways between said front and rear rollers, said runways being independent of said band, and further means positioning said automobile in operable relation to said rollers.

2. In a device of the class described, means adapted to transmit motion from the rear to the front wheels of a stationary operating automobile, said means being in the form of front and rear rollers geared together by an endless band, said rollers frictionally abutting the front and rear wheels respectively of said automobile, and auxiliary rollers between which and said rear rollers the rear wheels of said automobile rest, said auxiliary rollers being geared to said rear rollers for rotation therewith in the same direction.

3. In a device of the class described, pairs of rollers adapted to receive and support the rear wheels of an automobile therebetween, further rollers upon which the front wheels of such automobile rest and are positioned by said pairs of rollers, and means transmitting motion to the latter rollers from said first mentioned rollers.

In testimony whereof I affix my signature in presence of two witnesses.

CHARLES H. FENNELL.

Witnesses:
G. E. McGRANN,
EMMA H. DECLERCQ.